United States Patent Office 3,205,220
Patented Sept. 7, 1965

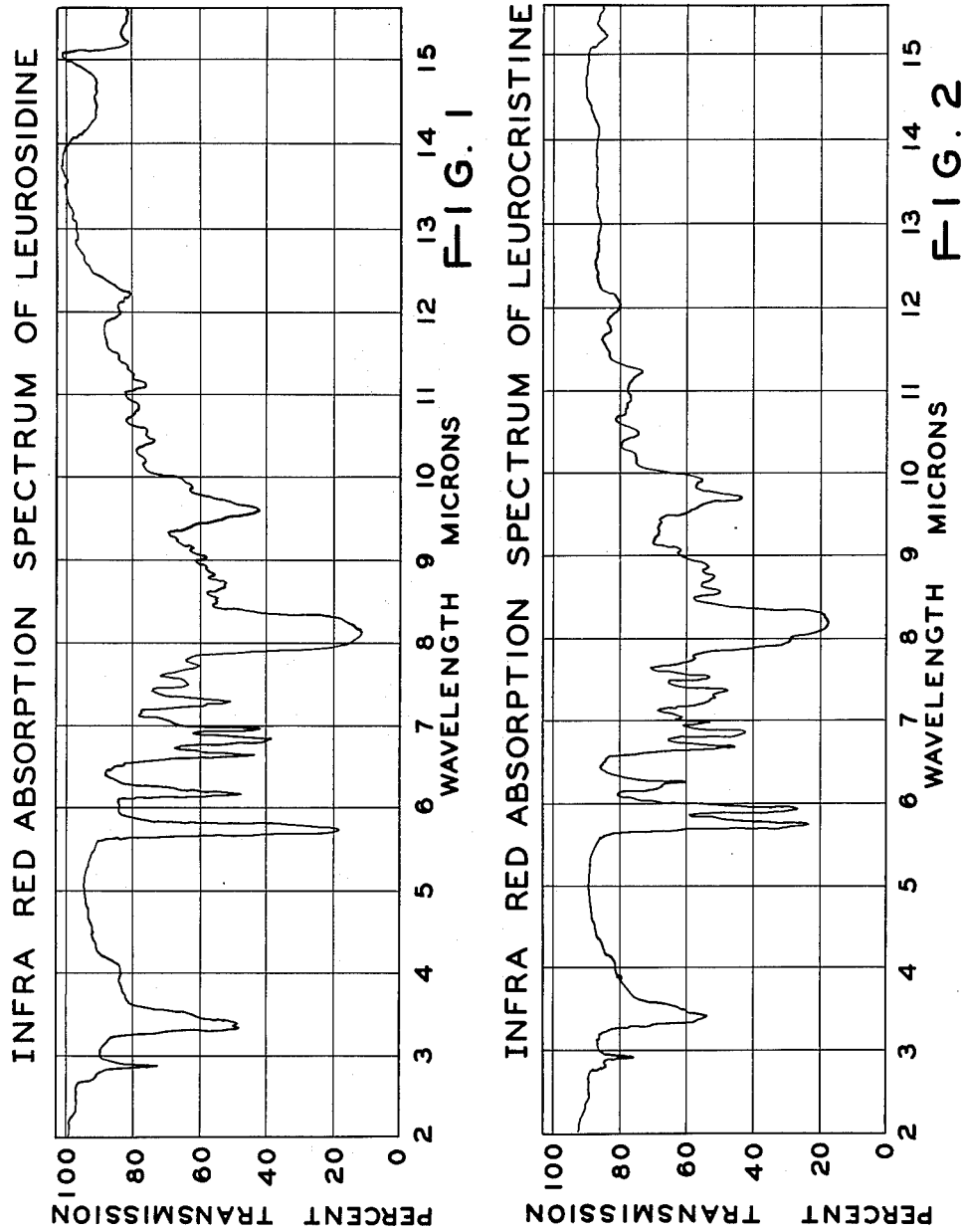
Sept. 7, 1965    G. H. SVOBODA ETAL    3,205,220
LEUROSIDINE AND LEUROCRISTINE AND THEIR PRODUCTION
Filed Oct. 26, 1961
*INVENTORS*
GORDON H. SVOBODA
ALBERT J. BARNES JR
BY ROBERT J. ARMSTRONG
ATTORNEY

3,205,220
LEUROSIDINE AND LEUROCRISTINE AND
THEIR PRODUCTION
Gordon H. Svoboda, Albert J. Barnes, Jr., and Robert J. Armstrong, all of Indianapolis, Ind., assignors to Eli Lilly and Company, Indianapolis, Ind., a corporation of Indiana
Filed Oct. 26, 1961, Ser. No. 147,911
8 Claims. (Cl. 260—236)

This invention relates to novel alkaloids obtainable from plants belonging to the family Apocynaceae.

A number of alkaloids have been obtained from plants belonging to the family Apocynaceae. Willaman and Schubert in Table II on page 255 of their article appearing in the Amer. J. of Pharm., 129 (1957) list about 137 alkaloids, some of them duplicates, which had been identified, and in some instances isolated, by scientists from apocynaceous plants. Among the plants of the family Apocynaceae, those belonging to the genus Vinca have been of particular interest because of the recent finding that vincaleukoblastine, an alkaloid derived from the leaves and stems of *Vinca rosea* Linn., is useful in the treatment of Hodgkin's disease and choriocarcinoma, two different malignant conditions. Oothe alkaloids which have been prepared from plants of *Vinca rosea* Linn. include ajmalicine, tetrahydroalstonime, serpentine, lochnerine, akuammine, vindolicine, vindoline, isoleurosine, catharanthine, lochnericine, leurosine, perivine, catharine, vincamicine, lochneridine, sitsirikine, and virosine.

It is an object of this invention to provide novel alkaloids derivable from plants of the family Apocynaceae which are even more effective than vincaleukoblastine in the treatment of malignancies, and which have a different anti-tumor spectrum than vincaleukoblastine. Other objects of this invention will become apparent from the following description.

This invention provides two new dimeric alkaloids, leurosidine and leurocristine, which are obtainable from amorphous alkaloidal fractions derived from apocynaceous plants. Also included within the scope of this invention are the acid addition salts and the quaternary ammonium derivatives of leurocristine and leurosidine.

Leurocristine and leurosidine are closely related dimeric alkaloids having two indole ring systems per molecule. The alkalodial free bases are high-melting crystalline solids, leurosidine free base melting at about 208–211° C. with decomposition and leurocristine free base melting at about 218–220° C. with decomposition.

Table I below gives the elemental anaylsis and molecular weight for leurocristine, leurosidine, and their sulfate salts.

TABLE I

|  | C | H | N | O | Mol. wt. |
|---|---|---|---|---|---|
| Leurocristine [1] | 66.73 | 7.06 | 6.75 | 19.44 | 824 |
| Leurocristine sulfate | 59.81 | 6.67 | 6.02 | 23.66 | 922 |
| Leurosidine | 67.08 | 7.34 | 6.24 | 18.81 | 826 |
| Leurosidine sulfate | 59.84 | 6.79 | 6.23 | 24.08 | 924 |

[1] Dried for 1 minute at 180° C.

In addition to their similarity in melting point and molecular weight, both of the free bases form salts with suitable anions; for example, sulfate salts with sulfuric acid. In addition, both free bases form quaternary ammonium derivatives by reaction with alkyl iodides such as methyl iodide. In properties other than those set forth above, however, leurosidine and leurocristine show considerable differences; for example, leurosidine is more dextrorotatory than leurocristine, having an $\alpha_D^{25} = +55.8°$ (c.=1 in chloroform), whereas leurocristine has an $\alpha_D^{25} = +17.0°$ (c.=1 in ethylene dichloride). Both alkaloids have two titratable basic groups when titrated in 33 percent aqueous dimethylformamide. The $pK_a$'s of the basic groups in leurosidine are at 5.0 and 8.8, while those of leurocristine are at 5.0 and 7.4. The ultraviolet absorption spectra in ethanol are also different. The spectrum of leurosidine has absorption peaks occurring at 214 and 265 m$\mu$ with inflections at 286, 295 and 310 m$\mu$, while the spectrum of leurocristine has peaks at 220, 255 and 296 m$\mu$ with inflections at 262 and 290 m$\mu$.

FIGURES 1 and 2 give the infrared spectra of the two novel alkaloids in the form of their free bases, using chloroform as a solvent. Table II gives the wave lengths of the infrared bands as measured from the spectra of FIGURES 1 and 2.

TABLE II

| Leurosidine | Leurocristine |
|---|---|
| Microns | Microns |
|  | 2.78 |
| 2.89 | 2.90 |
| 3.41 | 3.41 |
| 5.74 | 5.74 |
|  | 5.93 |
| 6.17 | 6.24 |
| 6.64 | 6.67 |
| 6.85 | 6.86 |
| 6.97 | 6.97 |
| 7.28 | 7.35 |
| 7.50 | 7.53 |
| 7.74 | 7.74 |
| 8.15 | 8.15 |
|  | 8.56 |
| 8.74 | 8.75 |
| 8.84 | 8.87 |
| 9.04 | 9.07 |
| 9.15 | 9.28 |
| 9.60 | 9.70 |
| 9.89 | 9.91 |
| 10.44 | 10.45 |
|  | 10.73 |
| 10.86 | 10.86 |
| 11.13 | 11.23 |
| 11.99 | 11.74 |
| 12.21 | 12.02 |

X-ray diffraction data have also been obtained for the crystalline free bases. Table III which follows gives the X-ray diffraction maxima for both alkaloids, together with the intensity of absorption for each maximum, as determined at a wave length of 2.2896 A. employing chromium radiation and a vanadium filler.

TABLE III

Leurosidine, $d$, A.: $I/I_1$
16.2 _____ 0.50
13.3 _____ 0.30
11.23 _____ 0.30
10.19 _____ 0.30
9.43 _____ 0.05
8.74 _____ 0.05
8.20 _____ 1.00
7.19 _____ 0.40
6.65 _____ 0.75
6.18 _____ 0.20
5.54 _____ 0.20
5.41 _____ 0.20
5.04 _____ 0.05
4.71 _____ 0.20
4.43 _____ 0.05
4.23 _____ 0.20
4.05 _____ 0.05
3.99 _____ 0.05
3.87 _____ 0.10
3.70 _____ 0.10
3.56 _____ 0.05
3.45 _____ 0.10
3.34 _____ 0.10

TABLE III—Continued

Leurocristine, d, A.: I/I₁

| | |
|---|---|
| 10.86 | 0.12 |
| 10.27 | 0.04 |
| 9.73 | 1.00 |
| 9.26 | 0.30 |
| 8.82 | 0.30 |
| 8.59 | 0.60 |
| 7.44 | 0.60 |
| 7.10 | 0.30 |
| 5.89 | 0.20 |
| 5.66 [1] | 0.30 |
| 5.45 | 0.80 |
| 5.17 | 0.08 |
| 5.09 | 0.08 |
| 4.76 [1] | 0.16 |
| 4.55 | 0.16 |
| 4.41 | 0.04 |
| 4.28 | 0.08 |
| 4.19 | 0.04 |
| 3.97 [1] | 0.20 |
| 3.83 | 0.02 |
| 3.77 | 0.02 |
| 3.62 | 0.08 |
| 3.57 | 0.08 |
| 3.42 | 0.12 |
| 3.35 | 0.04 |
| 3.24 | 0.04 |
| 3.20 | 0.04 |
| 3.08 | 0.08 |
| 2.96 | 0.08 |
| 2.85 | 0.04 |
| 2.78 | 0.04 |
| 2.63 | 0.04 |
| 2.47 | 0.04 |
| 2.43 | 0.04 |

[1] Indicates broad line.

Leurocristine and leurosidine can be prepared free from other alkaloids in the following manner: Leaves, stems or roots, separately or in admixture, of plants belonging to the family Apocynaceae, which plants have previously been shown to contain either one or both of the novel alkaloids leurocristine and leurosidine are dried and ground. The dried ground material is moistened with a dilute aqueous acid, and the moistened material is extracted with a water-immiscible organic solvent. The more strongly basic alkaloids are retained in the solid phase, while the weakly basic alkaloids including leurocristine and leurosidine as well as leurosine and vincaleukoblastine are extracted into the organic solvent. The organic extract is separated and concentrated. The weakly basic alkaloid fraction is extracted from the organic concentrate into aqueous acid. The acidic aqueous extract is separated and is extracted with a water-immiscible organic solvent. The acidic aqueous layer is made basic and the leurosidine-leurocristine alkaloid fraction is then extracted back into a water-immiscible organic solvent. This extract is subjected to a chromatographic separation procedure. In this procedure, leurosine and vincaleukoblastine are first preferentially eluted with a weakly polar solvent such as a benzene or ether. The fraction containing leurosidine and leurocristine, being more strongly bound, is then eluted from the chromatographic column with a somewhat more polar solvent-chloroform or methanol. This fraction is rechromatographed in order to afford a further purification and concentration of a leurosidine and leurocristine. The resulting chromatographic fractions containing leurosidine and leurocristine are then individually subjected to a gradient pH fractionation, or partition, procedure. This procedure consists of dissolving each chromatographic fraction in dilute acid and then raising the pH of each dissolved fraction successively by small increments (i.e. to 2.75, then to 3.40, then to 3.90, etc.) up to a pH of about 8 while extracting each fraction at each adjusted pH level with a water-immiscible organic solvent such as benzene, ether, chloroform, ethyl acetate or the like. The actual pH's involved are arbitrary, but the pH increment is preferably about one-half pH unit per step. Leurosidine is extracted from the chromatographic fractions by this procedure at adjusted pH's in the range from about 5 to about 7, whereas leurocristine is extracted at pH's from about 4.5 to about 6.5. The crude alkaloids are obtained by evaporating to dryness in vacuo the extracts provided by the above gradient pH separation procedure. The resulting amorphous residue is dissolved in a solvent such as methanol or ethanol. Leurosidine, if present, crystallizes under these conditions and is separated by filtration. Concentration and cooling of the filtrate yields leurocristine if present, as a crystalline substance, which is also separated by filtration. Alternatively, the alcoholic solutions prepared by dissolving the above amorphous residues can be treated directly with aqueous or ethanolic sulfuric acid, thus causing the precipitation of leurocristine sulfate. Filtrates from which leurosidine and leurocristine have been separated as crystalline alkaloidal basis can also be treated in like fashion to yield leurocristine sulfate.

In the above procedure, other acids such as acetic and citric and the like can be employed in place of tartaric acid. Water-immiscible organic solvents useful in various steps of the above procedure include benzene, ether, ethyl acetate, chloroform, ethylene dichloride, methyl isobutyl ketone and the like.

One of the novel alkaloids of this invention has antimitotic utility; for example, leurocristine and its salts produce a marked leukopenia in animals, indicating utility in the treatment of various malignancies, including leukemias, lymphomas, and solid tumors. Leurocristine, either as such or as sulfate salts, prolongs the life of mice in which the following malignancies have been transplanted: leukemia P–1534 strain, L–1210 strain, B–82A strain, and AKR strain; Sarcoma 180 ascites and Freund ascites; Ridgeway Osteogenic Sarcoma; Gardner Lymphosarcoma; Walker 256 Sarcoma; Adenocarcinoma 755; and Lilly Mammory Tumor DBA/1. The growth of other similar transplantable tumors can similarly be affected by treatment with leurocristine. Of particular interest is the finding that leurocristine sulfate gives indefinite prolongation of life in mice injected with P–1534 strain of leukemia when given intraperitoneally at doses of 0.25 mg./kg. and of 7.5 mg./kg. respectively.

In addition the compounds of this invention and their salts affect the central nervous system, being, in general, cardiac stimulants, respiratory stimulants, and hypotensive agents. The quaternary ammonium derivatives such as leurosidine methiodide and leurocristine methiodide also affect the central nervous system but have a more pronounced curare-like action than do the parent free bases or their acid addition salts. Leurocristine and leurosidine, in the form of their acid addition salts, also have demonstrated anti-algal activity.

When employed therapeutically, leurocristine, or an acid addition salt thereof is generally administered to a suitable subject in dosages varying from about 0.01 to about 10 mg./kg. of body weight. Leurocristine, preferably in the form of its sulfate salt, evokes a therapeutic response in various malignancies, including solid tumors, when administered in dose amounts varying from 0.01 to 0.2 mg./kg. The medicament is usually administered by the intravenous route although other routes of administration, including the oral, can be used. In clinical use the compounds are best maintained in a dry state until needed and are then diluted with a liquid physiologically compatible extending medium just prior to administration. By way of example, leurocristine sulfate is prepared for therapeutic use as follows: 100 mg. of leurocristine sulfate and 1000 mg. of lactose are dissolved in 100 mg. of water. The resulting solution is filled into 100 clean, dry, 10-ml. ampoules so that each ampoule contains 1 mg. of leurocristine sulfate and 10 mg. of lactose. The ampoule contents are then freeze-dried and the ampoules sealed. Just prior to use the ampoules are opened and 10 ml. of sterile water are added to dissolve the ingredients. A one-ml. dose of this therapeutic injectable formulation thus provides 0.1 mg. of leurocristine sulfate. For oral administration the compounds of this invention can also be mixed with solid pharmacologically acceptable extending media and the mixture filled into telescoping gelatin capsules or pressed into tables.

Leurocristine when administered in the dosage range outlined above is effective in relieving the symptoms and alleviating the discomfort which accompany various malignancies. Among the malignancies which can be thus favorably treated are Hodgkin's disease, acute lymphocytic leukemia, and lymphosarcoma. In many instances a remission of the disease is produced in Hodgkin's disease and leukemia.

This invention is further illustrated by the following specific examples:

EXAMPLE 1

9 kg. of ground, dried, whole *Vinca rosea* plants were defatted by stirring with two 45-liter portions of hexane. The defatted solids were moistened with 6 liters of 2 percent tartaric acid and were extracted by stirring with three 48-liter portions of benzene. The benzene extracts were combined and were concentrated in vacuo to a volume of about 9 liters. Twelve liters of 2 percent tartaric acid were added to the concentrate and the organic solvent was removed by steam distilation under reduced pressure, during which operation the weakly basic alkaloids, including leurosidine and leurocristine, dissolved in the aqueous acid layer as tartrate salts. The acid-insoluble material was separated by filtration, and the filter cake was dissolved in methanol. Twelve liters of 2 percent tartaric acid were added to the methanolic solution and the above steam distillation procedure was repeated. The tartaric acid layer was again filtered and the filtrate was combined with the previous tartaric acid filtrate. The combined solutions were extracted with two 6-liter portions of ethylene dichloride. These organic extracts contained tetrahydroalstonine, vindoline, and related alkaloids while the leurosidine and leurocristine remained in the aqueous acidic layer. The acidic solution was then made alkaline to litmus using 15 N ammonium hydroxide. Extraction of the ammoniacal solution with 6 liters of ethylene dichloride removed the alkaloid fraction containing leurosidine and leurocristine. Evaporation of the ethylene dichloride extract to dryness yielded about 20 grams of amorphous alkaloids.

Ten grams of the amorphous alkaloids were dissolved in benzene and the benzene solution was chromatographed over 400 grams of alumina (Alcoa alumina, grade F-20) which had previously been deactivated by treatment with 12.5 ml. of 10 percent acetic acid. The volume of each chromatographic fraction was arbitrarily set at 500 ml. Table IV which follows sets forth the results of this preliminary chromatographic separation. In the table, column 1 gives the number of the fraction, column 2 the eluting solvent or mixture of solvents, column 3 the major alkaloid obtained from that fraction, and column 4 the weight in grams of crystalline alkaloid obtained.

TABLE IV

| Fraction | Eluting solvent | Alkaloid | Wt., gram |
|---|---|---|---|
| 1 | Benzene | Catharanthine | 0.250 |
| 2 | do | Vindolinine (obtained as dihydrochloride) | 0.210 |
| 3-19 | do | Ajmalicine | 0.798 |
| 20-21 | do | Vindoline | 0.820 |
| 34-42 | Benzene-chloroform (1:1) | Leurosine | 0.234 |
| 43-45 | do | Vincaleukoblastine (obtained as sulfate) | 0.126 |
| 46 | Chloroform | Virosine | 0.010 |
| 47-52 | Chloroform-methanol | Amorphous residues | |

Leurocristine and leurosidine were among the alkaloids present in fractions 47–52.

3.6 kg. of amorphous residue corresponding to chromatographic fractions 47–52 of Table IV, obtained by extraction of a much larger amount of drug, were rechromatographed over 120 kg. of alumina deactivated with acetic acid as indicated above. The fractions listed in Table V were obtained by this second chromatography. In Table V, column 1 gives the number of the fraction, column 2 the volume of the fraction, column 3 the eluting solvent or mixture of solvents, column 4 the weight in grams of total alkaloid obtained, and column 5 the weight of crystalline alkaloid isolated therefrom.

TABLE V

| Fraction | Volume, l. | Eluting solvent | Wt., g. | Yield |
|---|---|---|---|---|
| 1 | 1,500 | Benzene | 140.1 | |
| 2, 3 | 150 | Benzene-chloroform (3:1) | 12.1 | |
| 4, 5 | 150 | do | 72.5 | 5.29 g. of leurosine; 9.50 g. of VLB[1] sulfate. |
| 6-8 | 150 | do | 97.5 | 2.70 g. of leurosine. |
| 9-14 | 150 | do | 161.6 | 28.9 g. of VLB[1] sulfate. |
| 15 | 150 | do | 29.7 | 3.70 g. of VLB[1] sulfate. |
| 16 | 150 | Benzene-chloroform (1:1) | 44.5 | |
| 17-29 | 150 | do | 1,092.1 | |
| 30-32 | 150 | Benzene-chloroform (1:3) | 336.5 | |
| 33 | 150 | do | 142.5 | |
| 34 | 150 | do | 87.8 | |
| 35 | 150 | do | 86.5 | |
| 36 | 150 | do | 63.8 | |
| 37 | 150 | do | 63.0 | |
| 38 | 150 | do | 47.8 | |
| 39 | 150 | do | 47.5 | |
| 40 | 150 | do | 31.2 | |
| 41 | 150 | do | 27.7 | |
| 42 | 150 | do | 27.1 | |
| 43 | 150 | do | 26.2 | |
| 44 | 150 | Chloroform | 43.0 | |
| 45-57 | 150 | do | 1,007.0 | |
| 58-67 | 150 | Chloroform-methanol (19:1) | 233.2 | |

[1] Vincaleukoblastine.

Partition of fractions 33–44 using a gradient extraction technique yielded leurocristine and leurosidine, both as crystalline alkaloids. The gradient pH extraction procedure was carried out as follows: A 10 g. aliquot was taken from each of the crude fractions 33–44 from Table V. Each aliquot was dissolved in separate 500 ml. portions of benzene and the resulting solutions were filtered to remove small amounts of insoluble material. Each benzene solution was then mixed with 500 ml. of 0.1 M citric acid and the mixture was steam-distilled under reduced pressure, during which operation the basic alkaloids dissolved in the aqueous layer as citrate salts. The citric acid solution was separated and filtered to remove insoluble material, and the filtrate volume was adjusted to 500 ml. by the addition of water. The pH of the resulting solution was about 2.8. Next each solution was extracted with 500 ml. of benzene and the benzene extract was separated. The pH of the aqueous phase was then raised successively by the addition of 15 N ammonium hydroxide to pH's of 3.4, 3.9, 4.4, 4.9, 5.4, 5.9, 6.4, and 7.5.

Table VII which follows lists the various fractions from which leurosidine, leurocristine, or leurocristine sulfate were obtained. In the table, column 1 gives the fraction from Table VI and columns 2–5 correspond to material extracted at pH's 4.9, 5.4, 5.9, and 6.4. In the table, a plus indicates that the particular alkaloid was obtained in crystalline form from that fraction and a minus indicates that the alkaloid was not obtained in crystalline form from that fraction.

TABLE VII

| Fraction | pH 4.90 | | | pH 5.40 | | | pH 5.90 | | | pH 6.40 | |
|---|---|---|---|---|---|---|---|---|---|---|---|
| | LD | LC | LC.SO$_4$ | LD | LC | LC.SO$_4$ | LD | LC | LC.SO$_4$ | LD | LC |
| 33 | − | − | + | − | + | + | + | + | + | − | − |
| 34 | − | + | + | − | + | + | + | − | + | − | − |
| 35 | − | + | + | + | + | + | + | − | − | + | − |
| 36 | − | + | + | + | + | + | + | − | − | + | − |
| 37 | − | + | + | + | + | + | + | + | + | + | − |
| 38 | − | − | + | + | + | + | + | + | + | + | − |
| 39 | − | − | + | + | + | + | + | − | + | + | − |
| 40 | − | − | + | + | + | + | + | + | + | + | − |
| 41 | − | − | + | + | + | + | + | − | − | + | − |
| 42 | − | − | + | + | + | + | + | − | − | + | − |
| 43 | − | − | − | + | + | + | + | − | − | + | − |
| 44 | − | − | − | + | − | + | + | − | − | + | − |
| 45 | − | − | − | + | − | + | + | − | − | + | − |

LD = Leurosidine.   LC = Leurocristine.   LC.SO$_4$ = Leurocristine Sulfate.

A 500 ml. benzene extract was taken from each aqueous phase at each pH. The benzene extracts were separately dried and evaporated to dryness in vacuo Table VI which follows gives the weights in grams of the amorphous alkaloids obtained by the gradient pH procedure for 10 gram aliquots of fractions 33–45 of Table IV. In Table VI, column 1 gives the fractions from Table IV, 10 g. of each of which were subjected to the above gradient pH extraction technique; and columns 2–11 give the weight of crude alkaloid obtained from each 10 grams sample at each pH.

TABLE VI

| Fraction | Acid insol. | 2.75 | 3.40 | 3.90 | 4.40 | 4.90 | 5.40 | 5.90 | 6.40 | 7.50 |
|---|---|---|---|---|---|---|---|---|---|---|
| 33 | 0.46 | 1.32 | 1.01 | 1.30 | 1.62 | 1.35 | 1.17 | 0.59 | 0.20 | 0.11 |
| 34 | 0.45 | 0.92 | 0.99 | 1.22 | 1.49 | 1.36 | 1.48 | 0.91 | 0.28 | 0.15 |
| 35 | 0.62 | 0.89 | 0.90 | 1.03 | 1.54 | 1.29 | 1.50 | 1.08 | 0.39 | 0.17 |
| 36 | 0.50 | 1.05 | 0.90 | 1.07 | 1.23 | 1.37 | 1.52 | 1.18 | 0.37 | 0.18 |
| 37 | 0.39 | 1.22 | 1.00 | 1.11 | 1.37 | 1.29 | 1.55 | 0.96 | 0.32 | 0.16 |
| 38 | 0.51 | 1.04 | 0.92 | 0.77 | 1.43 | 1.42 | 1.53 | 1.28 | 0.42 | 0.19 |
| 39 | 0.60 | 1.09 | 0.83 | 1.00 | 1.39 | 1.36 | 1.25 | 1.01 | 0.36 | 0.17 |
| 40 | 0.55 | 1.43 | 0.85 | 0.91 | 1.23 | 1.39 | 1.38 | 0.99 | 0.38 | 0.20 |
| 41 | 0.67 | 1.03 | 0.82 | 1.11 | 1.19 | 1.23 | 1.29 | 1.15 | 0.46 | 0.21 |
| 42 | 0.84 | 1.01 | 0.97 | 1.02 | 1.36 | 1.24 | 1.21 | 0.90 | 0.36 | 0.18 |
| 43 | 0.76 | 1.05 | 1.14 | 1.27 | 1.42 | 1.30 | 1.08 | 0.76 | 0.29 | 0.15 |
| 44 | 0.71 | 0.97 | 1.20 | 1.68 | 1.72 | 1.45 | 0.91 | 0.55 | 0.21 | 0.12 |
| 45 | 0.34 | 0.77 | 0.90 | 0.88 | 0.89 | 1.26 | 1.27 | 1.36 | 0.32 | 0.13 |

Each amorphous residue obtained above was dissolved in methanol, and the resulting solution was chilled. The crystalline material, if any, was separated by filtration, and its physical constants were determined in order to aid in its identification. In addition, paper strip chromatography was carried out on each crystalline fraction thus obtained to see whether it contained a single alkaloid or was a mixture of alkaloids. The two novel alkaloids of this invention were obtained by this procedure. The first alkaloid, leurosidine, was isolated as a crystalline base from each of fractions 33–45 at pH's of 5.40, 5.90 and 6.40, and the second, leurocristine, was obtained from fractions 33–42 at pH's of 4.90, 5.40 and 5.90. In a number of cases, leurosidine was obtained as a first crystalline crop and leurocristine as a second crystalline crop by concentrating and cooling the filtrate from the crystallization of leurosidine. Mother liquors from which crystalline leurosidine had been isolated at pH's 4.9, 5.4, and 5.9 were treated with sulfuric acid in the manner set forth below in Example 2 to yield leurocristine sulfate.

Leurosidine is easily recrystallized from either ethanol or methanol. It crystallizes in the form of blades which show parallel extinction under polarized light. Leurosidine melts at about 208–211° C. with decomposition; $\alpha_D^{25} = +55.8°$ C. (c. = 1 in chloroform).

Leurocristine crystallizes from methanol in the form of blades which show oblique extinction under polarized light. The compound melts at about 218–220° C. with decomposition $\alpha_D^{25} = +17.0°$ C. (c. = 1 in ethylene dichloride).

The above gradient pH separation technique can be used successfully with the alkaloidal fraction obtained after the initial chromatography. In addition, as would be expected, it is possible by using a large excess of alumina to utilize only one chromatographic separation procedure instead of the two which were employed for practical purposes in the above example. Thus, the term chromatographic separation procedure as used herein indicates separation of alkaloidal bases by selective elution whether 1, 2, or even 10 separate chromatographic procedures are used to remove associated impurities prior to the elution of the desired alkaloids.

In the above chromatographic separation procedure, benzene-chloroform solvent systems were employed to selectively elute the leurosidine-leurocristine alkaloid fraction. It had previously been determined that the use of this solvent system gave a good separation of the desired alkaloids from companion alkaloids in a reasonable length of time. In determining the optimal elution solvent system, a small scale experimental chromatographic separation was carried out in which the alkaloidal mixture was placed on a column prepared from deactivated alumina and a group of eluting solvents were passed over the column in order of increasing eluting power. A useful list of such eluting solvents based upon increasing dielectric constant can be found in an article by Jacques and Mathieu-Bull Soc. Chem. France (1946), 94–98. This list is as follows: hexane, benzene, ether, chloroform, ethylacetate, dichloroethane, butanol, acetone, ethanol and methanol. Furthermore, in determining the effect of a given eluting solvent it is customary to introduce each new solvent as a small percentage of the previous solvent so as to avoid any abrupt change in eluting power with a consequent elution of all material remaining on the column as an unresolved mixture. In actual practice, ether was omitted from the group of solvents used to determine the optimal solvent mixture for separating leurosidine and leurocristine from companion alkaloids, because of the fire hazard attendant upon its use on an industrial scale.

As is common in most chromatographic separations, the actual eluting solvent employed is not critical. For example, according to Table V above, the desired alkaloids, leurocristine and leurosidine, were eluted by a benzene-chloroform 1:3 solvent system. A pure benzene or a benzene-chloroform 3:1 solvent system would probably have given a similar separation, but the time necessary to achieve the same degree of separation would have been greatly increased. In general, a solvent with lower dielectric constant elutes more slowly but gives a better degree of separation while a solvent with a high dielectric constant gives a rapid but less selective elution.

Another factor which controls the choice of eluting solvent in a chromatographic separation is the degree of activity of the aluminia. For example, in the above chromatography, an alumina deactivated with acetic acid and water was employed. Use of a more active alumina would have required either a longer elution time for the same solvent system or use of a solvent system with a higher dielectric constant. Conversely, use of a less active alumina would have meant that a solvent system with a lower dielectric constant would be needed to elute leurosidine and leurocristine in in the same length of time with the same degree of purity.

EXAMPLE 2

*Preparation of leurosidine sulfate*

1 gram of leurosidine was dissolved in 30 ml. of acetone. A solution containing 5 ml. of 1 percent aqueous sulfuric acid in 42 ml. of water was added to the acetone solution of the alkaloid. The resulting mixture was evaporated to dryness in vacuo. The residue comprising leurosidine sulfate was dissolved in anhydrous ethanol by heating. Chilling of the ethanolic solution yielded crystalline leurosidine sulfate melting at about 237–245° C. There was a loss of solvent in the range 201–212° C.

Leurocristine sulfate was prepared in an entirely analogous fashion from leurocristine free base. The compound melted at about 273–281° C. after recrystallization from ethanol. There was a loss of solvent in the range 210–232° C.

Ethanol can be substituted for water in the mixture with 1 percent aqueous sulfuric acid in the above preparation method.

Other salts of leurocristine and leurosidine such as the phosphate, nitrate, hydrochloride, hydrobromide, benzoate, succinate, tartrate, and the like are prepared by substituting the appropriate acid for sulfuric acid in the above example.

EXAMPLE 3

*Direct preparation of leurocristine sulfate*

Amorphous alkaloids from chromatographic fractions corresponding to fractions 33–45 in Table IV were combined. The crude alkaloid mixture was dissolved in anhydrous ethanol and a solution of 1 percent sulfuric acid in ethanol was added thereto. The pH of the resulting solution was about 4.0. The mixture was chilled at about 0° C. overnight. A brown solid precipitated during this time and was separated by filtration. The mother liquor remained at ambient room temperature for about 5 days, finally yielding a white crystalline solid comprising leurocristine sulfate.

EXAMPLE 4

*Preparation of methiodides of leurosidine and leurocristine*

0.001 mole of leurocristine was dissolved in about 10 ml. of benzene. 0.002 equivalent of methyl iodide were added to the benzene solution and the resulting mixture was kept at ambient room temperature for about 5 hours, during which time crystalline leurocristine methiodide precipitated. The mixture was chilled for about 2 hours to cause further precipitation of leurocristine methiodide. The precipitate was separated by filtration and was recrystallized from ethanol. Leurocristine methiodide thus prepared melted at about 226–232° C. *Analysis.*—Found: I, 13.08.

Leurosidine methiodide was prepared by substituting leurosidine for leurocristine in the above procedure. Leurosidine methiodide melted with decomposition at about 198–216° C. after recrystallization from ethanol. There was a loss of solvent at about 173–178° C. *Analysis*—Found: I, 13.05.

Other quaternary salts of leurosidine and leurocristine are prepared by substituting other alkyl and aralkyl halides, sulfate, etc. for methyl iodide in the above procedures. Among the compounds which can be thus substituted are the following: benzyl chloride, p-nitrobenzylbromide, ethyl iodide, dimethylsulfate, propylbromide, butyl iodide, m-chlorophenethyl iodide, o-ethoxy benzyl chloride and the like.

EXAMPLE 5

*Preparation of leurocristine and leurosidine from 90% leaf*

800 kg. of *Vinca rosea* plants consisting of about 90% leaf and 10% stems were wetted with 540 liters of 2% aqueous tartaric acid. The wetted leaf was extracted by stirring with five 4000-liter portions of benzene. The benzene extracts were combined and were concentrated in vacuo to a volume of about 500 liters. 1,070 liters of 2% aqueous tartaric acid were added to the benzene concentrate and the remainder of the benzene was removed by vacuum steam distillation. The acidic aqueous concentrate was filtered to remove insoluble material and its acidity was then adjusted to a pH of about 3 by the addition of 28% aqueous ammonia. The acidic solution was extracted with two 540-liter portions of benzene. The benzene extracts were separated and discarded. The acidity of the aqueous solution was adjusted to a pH in the neighborhood of 8.5 to 9.0 again by the addition of 28% aqueous ammonia. The basic solution was extracted with two 540-liter portions of benzene, and the benzene extracts were separated and were combined. The combined extracts were dried and concentrated in vacuo to a volume of about 15 liters. The benzene concentrate was divided into three equal portions, each of which were separately chromatographed over 40 kg. batches of deactivated alumina. Each 40 kg. batch of alumina had been deactivated with 7.5 liters of water and 347 ml. of glacial acetic acid. The chromatogram was developed according to the procedure of Example 1, the eluant solvents being benzene, benzene-chloroform 3:1, benzene-chloroform 1:1, benzene-chloroform 1:3, and chloroform. The mother liquors from the isolation of vincaleukoblastine sulfate plus the chloroform eluant were combined. The combined solution was dried and was then poured slowly with stirring into a solution of 336 grams of citric acid and 16 liters of water. The acidity of the solution was adjusted to a pH of about 4.4 with 28% aqueous ammonia and the solution was then extracted with two 16-liter portions of benzene. The benzene extracts were combined; the combined extracts were dried with anhydrous sodium sulfate and were concentrated to dryness in vacuo. The acidity of the aqueous layer was then adjusted to about pH 7.0 with 28% aqueous ammonia and the resulting solution was again extracted with two 16-liter portions of benzene. The benzene extracts were combined; the combined extracts were dried with anhydrous sodium sulfate, and the solvents were removed by evaporation in vacuo, leaving a mixture of alkaloids as a residue.

40 grams of the residual alkaloids were dissolved in 300 ml. of benzene and the resulting solution was chromatographed over 1335 grams of alumina partially deactivated by treatment with 80 ml. of water and 4 ml. of acetic acid. The chromatogram was developed by use of the same five solvents and solvent mixtures outlined above. Leurocristine and leurosidine were eluted by the chloroform-benezene 1:1 solvent system. Each chromatographic fraction containing leurosidine and/or leurocristine was evaporated to dryness in vacuo and the residual alkaloidal material was crystallized from methanol. Leurosidine, when present, precipitated as a first crystalline fraction and leurocristine was obtained by concentration and cooling of the mother liquors from the leurosidine crystallization. Leurocristine sulfate was also obtained from the mother liquors derived from the direct crystallization of leurocristine free base by using the method of Example 3.

The above separation was repeated except that the 90 percent *Vinca rosea* leaf was wetted with 32 liters of aqueous ammonia and 560 liters of water. After the initial acidic aqueous solution had been extracted at a pH of 3, its acidity was adjusted to pH 5 and the extraction with benzene to remove the desired alkaloids was made at this pH instead of pH 8.5 as in the above example. The alkaloids extracted at pH 5 were chromatographed as outlined above to yield leurocristine and leurosidine.

We claim:

1. A member of the group consisting of leurocristine, leurosidine, and acid addition salts and quaternary ammonium derivatives formed with lower alkyl halides of leurosidine and leurocristine:

(A) said alkaloid leurosidine having the following chemical and physical properties:

(a) elemental analysis: C, 67.08; H, 7.34; N, 6.24; O, 18.81

(b) melting point=208–211° C. uncorr.

(c) optical rotation, $\alpha_D^{25} = +55.8°$ (c=1 in chloroform)

(d) logarithmic dissociation constants ($pK_a$) at 5.0 and 8.8 (determined in 33 percent aqueous dimethylformamide)

(e) ultraviolet absorption maxima at 214 and 265 m$\mu$ with inflections at 286, 295 and 310 m$\mu$ (determined in ethanol)

(f) infrared absorption maxima at 2.89, 3.41, 5.74, 6.17, 6.64, 6.85, 6.97, 7.28, 7.50, 7.74, 8.15, 8.74, 8.84, 9.04, 9.15, 9.60, 9.89, 10.44, 10.86, 11.13, 11.99 and 12.21 microns and (g) X-ray diffraction maxima at 16.2, 13.3, 11.23, 10.19, 9.43, 8.74, 8.20, 7.19, 6.65, 6.18, 5.54, 5.41, 5.04, 4.71, 4.43, 4.23, 4.05, 3.99, 3.87, 3.70, 3.56, 3.45 and 3.34 A.

(B) said alkaloid leurocristine having the following chemical and physical properties:

(a) elemental analysis: C, 66.73; H, 7.06; N, 6.75; O, 19.44

(b) melting point=218–220° C. uncorr.

(c) optical rotation, $\alpha_D = +17°$ (c.=1 in ethylene dichloride)

(d) logarithmic dissociation constants ($pK_a$) at 5.0 and 7.4 (determined in 33 percent aqueous dimethylformamide)

(e) ultraviolet absorption maxima at 220, 255 and 296 m$\mu$ with inflection at 262 and 290 m$\mu$ (determined in ethanol)

(f) infrared absorption maxima at 2.78, 2.90, 3.41, 5.74, 5.93, 6.24, 6.67, 6.86, 6.97, 7.35, 7.53, 7.74, 8.15, 8.56, 8.75, 8.87, 9.07, 9.28, 9.70, 9.91, 10.45, 10.73, 10.86, 11.23, 11.74 and 12.02 microns and (g) X-ray diffraction maxima at 10.86, 10.27, 9.73, 9.26, 8.82, 8.59, 7.44, 7.10, 5.89, 5.66, 5.45, 5.17, 5.09, 4.76, 4.55, 4.41, 4.28, 4.19, 3.97, 3.83, 3.77, 3.62, 3.57, 3.42, 3.35, 3.24, 3.20, 3.08, 2.96, 2.85, 2.78, 2.63, 2.47 and 2.43 A.

2. Leurosidine as claimed in claim 1.

3. The sulfate salt of leurosidine as claimed in claim 1.

4. Leurocristine as claimed in claim 1.

5. The sulfate salt of leurocristine as claimed in claim 1.

6. The method of preparing the alkaloids leurocristine and leurosidine in substantially pure form which comprises contacting plant material from plants of the species *Vinca rosea* containing one or both of the said alkaloids with 2% tartaric acid and benzene, thus causing the weakly basic alkaloids to pass into the benzene phase, separating said benzene phase and extracting therefrom the weakly basic alkaloids with 2% tartaric acid, separating the aqueous acid extract, making said aqueous acid extract alkaline and extracting the weakly basic alkaloids therefrom with a water-immiscible organic solvent selected from the class consisting of benzene, chloroform, and ethylenedichloride, subjecting said weakly basic alkaloids to a chromatographic separation procedure over deactivated alumina; obtaining leurosidine and leurocristine substantially free from companion alkaloids by preferential elution during said chromatographic separation procedure using a benzene-chloroform eluant; subjecting chromatographic fractions containing leurocristine and leurosidine substantially free from companion alkaloids, to a gradient pH extraction procedure whereby leurosidine is extracted into benzene from aqueous solution at a pH in the range 5.0–7.0, and leurocristine is extracted into benzene from aqueous solution at a pH in the range 4.5–6.5, evaporating said extracts derived from said pH gradient extraction procedure to dryness, and recovering leurocristine and leurosidine from said dried alkaloidal fractions by crystallization.

7. The method of preparing leurocristine and leurosidine in substantially pure form which comprises contacting plants of the species *Vinca rosea* containing one or both of the said alkaloids with 2% tartaric acid and benzene, thus causing the weakly basic alkaloids to pass into the benzene phase, separating said benzene phase and extracting therefrom the weakly basic alkaloids with 2% tartaric acid, making said extract alkaline and extracting the weakly basic alkaloids therefrom with a water-immiscible organic solvent selected from the class consisting of benzene, chloroform, and ethylenedichloride, subjecting said weakly basic alkaloids to a chromatographic separation procedure over deactivated alumina, obtaining leurosidine and leurocristine substantially free from companion alkaloids by preferential elution during said chromatographic separation procedure using a chloroform-benzene eluant, evaporating leurosidine- and leurocristine-containing fractions to dryness and recovering leurocristine and lerosidine from said dried alkaloidal fractions by crystallization.

8. A therapeutic composition in unit dosage form comprising a physiologically compatible extending medium and a compound selected from the group consisting of leurocristine, and its acid addition salts, said alkaloid leurocristine having the following chemical and physical properties:

(a) elemental analysis: C, 66.73; H, 7.06; N, 6.75; O, 19.44

(b) melting point=218–220° C. uncorr.

(c) optical rotation, $\alpha_D^{25} = +17°$ (c.=1 in ethylene dichloride)

(d) logarithmic dissociation constants ($pK_a$) at 5.0 and 7.4 (determined in 33 percent aqueous dimethylformamide)

(e) ultraviolet absorption maxima at 220, 255 and 296 mμ with inflection at 262 and 290 mμ (determined in ethanol)
(f) infrared absorption maxima at 2.78, 2.90, 3.41, 5.74, 5.93, 6.24, 6.67, 6.86, 6.97, 7.35, 7.53, 7.74, 8.15, 8.56, 8.75, 8.87, 9.07, 9.28, 9.70, 9.91, 10.45, 10.73, 10.86, 11.23, 11.74 and 12.02 microns and
(g) X-ray diffraction maxima at 10.86, 10.27, 9.73, 9.26, 8.82, 8.59, 7.44, 7.10, 5.89, 5.66, 5.45, 5.17, 5.09, 4.76, 4.55, 4.41, 4.28, 4.19, 3.97, 3.83, 3.77, 3.62, 3.57, 3.42, 3.35, 3.24, 3.20, 3.08, 2.96, 2.85, 2.78, 2.63, 2.47 and 2.43 A., the said therapeutic composition being adapted to provide the said compound in a dose amount of about 0.01 to about 10 mg./kg. of body weight of the treated subject per day.

References Cited by the Examiner

UNITED STATES PATENTS 2,509,051   5/50   Applezweig _____ 260—236

OTHER REFERENCES

Beer: British Empire Cancer Campaign, 33rd Annual Report (1955), pages 487 and 488.

Berggren et al.: Acta Chemica Scandinavica, volume 12 (1958), page 1521.

Degering: An Outline of Organic Nitrogen Compounds, University Lithoprinters, Ypsilanti, Mich. (1950), page 580.

Degering: An Outline of Organic Nitrogen Compounds, University Lithoprinters, Ypsilanti, Michigan (1950), page 582.

Frie et al.: Cancer Chemotherapy Reports, volume 12 (June 1961), page 128.

Johnson et al.: Cancer Research, vol. 20 (Aug., 1960), pages 1016–1022.

Willaman et al.: Economic Botany, (April-June 1955), pages 143 and 144.

WALTER A. MODANCE, *Primary Examiner.*

IRVING MARCUS, *Examiner.*